(12) United States Patent
Brinz et al.

(10) Patent No.: US 7,191,917 B2
(45) Date of Patent: Mar. 20, 2007

(54) METERING DEVICE AND METHOD FOR OPERATING SUCH

(75) Inventors: Thomas Brinz, Bissingen A.D. Teck (DE); Jane Lewis, Stuttgart (DE); Markus Tiefenbacher, Fellbach-Schmiden (DE); Thomas Geiger, Walddorfhaeslach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/159,923

(22) Filed: Jun. 22, 2005

(65) Prior Publication Data
US 2005/0283113 A1 Dec. 22, 2005

(30) Foreign Application Priority Data
Jun. 22, 2004 (DE) .................... 10 2004 030 155

(51) Int. Cl.
*A61M 37/00* (2006.01)
*A61M 5/00* (2006.01)
*B67D 5/00* (2006.01)
*B01L 3/02* (2006.01)

(52) U.S. Cl. .................... 222/25; 222/28; 222/145.1; 222/162; 604/82

(58) Field of Classification Search ............ 222/23–28, 222/154, 162, 323, 145.1, 145.5, 254; 504/82, 504/87, 88, 191, 231, 232, 416; 604/82, 604/87, 88, 191, 231, 232, 416
See application file for complete search history.

(56) References Cited

U.S. PATENT DOCUMENTS

| 4,741,737 | A | * | 5/1988 | Meyer et al. ............... 604/231 |
| 4,805,810 | A | | 2/1989 | Czetwertynski ............. 222/319 |
| 5,330,426 | A | * | 7/1994 | Kriesel et al. ................ 604/82 |
| 5,433,343 | A | * | 7/1995 | Meshberg ..................... 222/25 |
| 5,531,683 | A | * | 7/1996 | Kriesel et al. ................ 604/82 |
| 6,719,729 | B2 | * | 4/2004 | Sogaro ....................... 604/191 |
| 2003/0055384 | A1 | * | 3/2003 | Enrenfels et al. ........... 604/191 |

FOREIGN PATENT DOCUMENTS

| DE | 199 15 771 | 1/2001 |
| GB | 1178738 | 1/1970 |
| GB | 1441983 | 7/1976 |

* cited by examiner

*Primary Examiner*—Willis R. Wolfe, Jr.
(74) *Attorney, Agent, or Firm*—Kenyon & Kenyon LLP

(57) ABSTRACT

A metering device or a metering element, in particular for metering substances in the compiling of combinatory material libraries, described as comprising a metering element having a supply vessel, open on one side, for holding the substances to be metered, and a plunger, which is axially displaceable and reversibly seals the opening of the supply vessel and which has at least one, preferably centered metering orifice for metering the substances provided in the supply vessel, the supply vessel and/or the plunger having an accommodation as contact point for a mechanical gripping device. Moreover, a metering method is described.

12 Claims, 2 Drawing Sheets

METERING DEVICE AND METHOD FOR OPERATING SUCH

FIELD OF THE INVENTION

The present invention relates to a metering device, a metering element and a method for operating such

BACKGROUND INFORMATION

The discovery and development of new substances and materials is a primary goal of the material sciences, of chemistry and pharmacy. However, the search for suitable compounds is often very costly and time-consuming. To be able to conduct this search more effectively and inexpensively, a systematic methodology which has become known under the name of "combinatory chemistry" had been introduced in the pharmaceutical and then also in other application fields years ago already. Here, several potentially interesting compounds are produced and analyzed in parallel. The advantage of this method is that automation is possible, which allows high processing speeds in a minimum of time.

To produce the material libraries required in this context, a large number of potentially interesting substances or their progenitor compounds must be positioned or metered at defined points of corresponding substrates. Because of the generally large number of substances to be metered, this is preferably done in a fully automatic manner. Conventional metering roboters utilize systems in which the substance to be metered is taken up by means of a syringe which is connected to a metering needle via a connection hose. The syringe as well as the connection hose and the metering needle are initially filled only with an operating fluid, the metering needle being filled with air at its end facing the metering orifice. For metering, the metering needle is dipped into the substance to be metered and the plunger of the syringe pulled out of the associated metering body. Due to the volume enlargement, the substance to be metered is drawn into the metering needle and into the connection hose. The air contained in the metering needle forms a buffer, so that contamination or mixing of the substance to be metered and the operating fluid is avoided. A disadvantage of such a metering system is that the air buffer present in the metering needle is compressible, and highly viscous media or suspensions can thus be metered only with difficulties.

SUMMARY OF THE INVENTION

It is an objective of the present invention to provide a metering device or a metering element and a method for operating the same that also allows the automated metering of highly viscous media.

The metering device or the metering element according to the present invention as well as the method for operating such have the advantage of allowing an automated metering of highly viscous media in a simple yet reliable manner. In the process, a metering element with a supply reservoir is used, which is open on one side and holds the substances to be metered and also includes a plunger which is axially displaceable and reversibly seals the opening of the supply reservoir, the plunger being provided with at least one metering orifice, preferably centrically positioned, for the metering of the substances deposited in the supply reservoir. The substances to be metered are first placed directly in the supply reservoir while the plunger is removed. This advantageously allows also solid materials or highly viscous media to be filled into the supply reservoir, which, due to the action of the vacuum pressure alone, cannot be aspirated into the storage reservoir through a metering needle provided at the plunger when the plunger is sealed.

To ensure reliable automated handling of plunger and storage reservoir, an accommodation is provided on the plunger and/or at the bottom of the storage reservoir as contact point for a mechanical gripping device.

The metering of the substances deposited in the storage reservoir advantageously takes place without the use of operating liquid.

The plunger is advantageously joined to a piston barrel which has a metering line for metering the deposited substances and is provided with an exchangeable metering needle at its end facing away from the plunger. The metering needle is connected to the piston barrel via a Luer lock closure, for instance. The exchangeability of the metering needle is advantageous if the metering needle becomes contaminated by foreign matter during the metering. Since each substance to be metered is advantageously assigned its own supply reservoir with a separate plunger, any possibility of contamination with foreign matter can be excluded.

In another advantageous specific embodiment, the metering device has several metering elements whose supply reservoirs have an essentially identical linear extension and different diameters. In this manner different volumes may be realized in the supply reservoirs without an adaptation of the automatic gripping device being necessary. It is especially advantageous in this case if the particular accommodation of the supply reservoir or the plunger is coded to detect the volume or the diameter of the associated supply reservoir.

In an especially advantageous specific embodiment, at least two substances are deposited in a supply reservoir, these substances being mixed in the supply reservoir prior to metering by a mixing device integrated in the supply reservoir or provided from the outside. Furthermore, once the vessel is sealed, the substances deposited in the supply reservoir are able to be degassed via the metering orifice penetrating the plunger. In addition, there is the advantageous possibility of subjecting the substances deposited in the supply reservoir to a chemical conversion prior to their metering.

DETAILED DESCRIPTION

The idea on which the present invention is based is to provide a metering device or a metering element that allows an efficient and automated metering of numerous substances required especially within the framework of combinatory material development for the compiling of combinatory material libraries.

Figure 1:
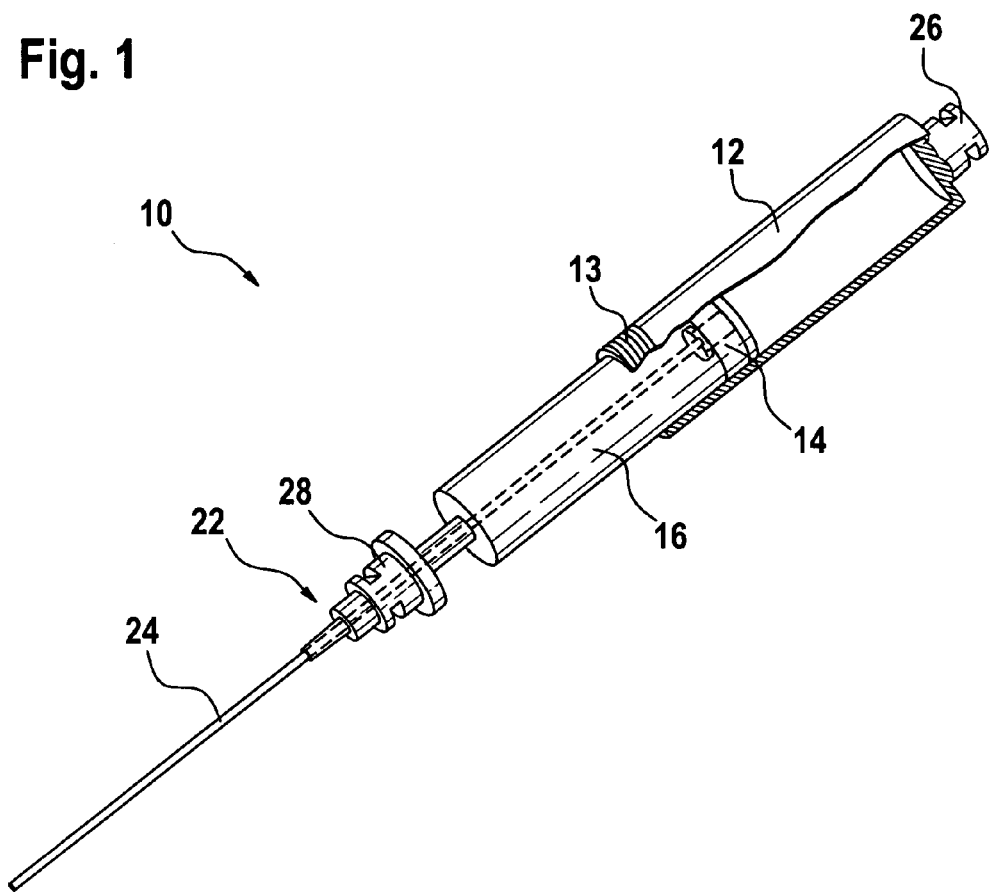
FIG. 1 shows a plan view of a metering element as component of a metering device, in a schematic representation.
Figure 2:
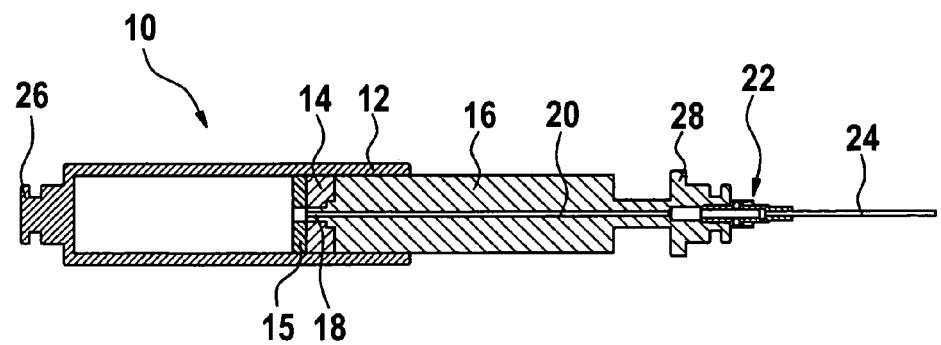
FIG. 2 shows a sectional view of the metering element illustrated in FIG. 1.

At the core of the metering device is one or a plurality of metering element(s) as shown in FIGS. 1 and 2 by way of example. Metering element 10 includes a supply reservoir 12 in which one or a plurality of substances to be metered is able to be deposited. Supply reservoir 12 is made of a material that is in essence chemically inert, for instance glass, PTFE or PVC. Supply reservoir 12 preferably has a cylindrical design, one end of supply reservoir 12 being open and able to be sealed by a plunger 14. To ensure that supply reservoir 12 can be sealed independently of plunger 14, supply reservoir 12 has a thread 13 impressed on the outer wall of supply reservoir 12, preferably in the region of its opening.

Preferably at its side facing the substance to be metered, plunger 14 is provided with a seal 15 which is mechanically fixated, for instance, and thus designed to be exchangeable. On its side facing away from the substance to be metered, plunger 14 goes over into a piston barrel 16, which preferably has four suitable ribs for improved guidance. Plunger 14 and piston barrel 16 are preferably made of stainless steel or a chemically inert polymer such as PTFE or PVC.

A special feature of the metering element is that, in contrast to conventional metering syringes known especially from the medical field, the metering of the deposited substances is implemented via a cutout 18 of plunger 14. To this end, piston barrel 16 joined to plunger 14 has a metering line 20 through which a substance to be metered is able to be transported from supply reservoir 12 through cutout 18. On its side facing away from plunger 14, piston barrel 16 has, for instance, a mechanical fixation device 22 for a metering needle 24. Mechanical fixation device 22 is preferably implemented as Luer lock closure.

To ensure automated metering in a short time cycle, an accommodation or fitted region 26, 28, which is used as contact point for a mechanical gripping device, is provided on supply reservoir 12 on its side lying across from the orifice, and/or on plunger 14 or piston barrel 16 on its side facing away from the substance to be metered.

For metering, each substance or substance mixture to be metered is preferably assigned a separate metering element. This effectively avoids intermixing or cross-contamination of the substances. To fill metering element 10, its plunger 14 is first removed and the substance deposited in open supply reservoir 12. Plunger 14 is then inserted into supply reservoir 12, the air present there being able to escape via metering line 20. Plunger 14 is preferably introduced to such that the entire air in supply reservoir 12 is displaced. Should the deposited substance be a substance that reacts with air, the substance may be supplied in a protective gas apparatus, or a substance already deposited may be degassed in a conventional manner through metering line 20.

Another possibility is to fill a plurality of substances and possibly solvents into supply reservoir 12 one after another and to then mix them together, either with the aid of an external agitator such as a magnetic stirrer, or with the aid of a stirring device provided in supply reservoir 12, for instance glass balls.

The metering of the deposited substances or substance mixtures is implemented in that metering element 10 is gripped by a mechanical gripping device at accommodations 26, 28, brought to the metering location, where the deposited substances or substance mixtures are metered by pressure on plunger 16 or supply reservoir 12.

The metering element thus includes at least one metering element 10, at least one gripping device and at least one control unit to control the gripping device.

In another specific embodiment, metering element 10 is additionally used as chemical reactor. To this end, the substances deposited in supply reservoir 12 of metering element 10 are subjected to a chemical reaction prior to being metered. Metering element 10 may have a corresponding heating, stirring or cooling device for this purpose.

However, these devices may just as well be designed in such a way that they are temporarily affixable or are merely available upon demand.

FIGS. 3a through 3f show a number of variants of metering element 10, which differ especially with regard to the possible metering volumes. Notwithstanding different volumes of supply reservoirs 12, the linear extension of metering element 10 is kept largely constant. Different volumes are achieved by selecting appropriate diameters of supply reservoir 12. In this way metering elements 10 having different metering volumes may be utilized for the metering one after another without an adaptation of the mechanical gripping device being required. Moreover, it is possible to design accommodations 26, 28 such that they have markings to identify the metering volume, so that the mechanical gripping device is automatically adapted to the corresponding metering volume of the presently mounted metering element.

Figure 3A:
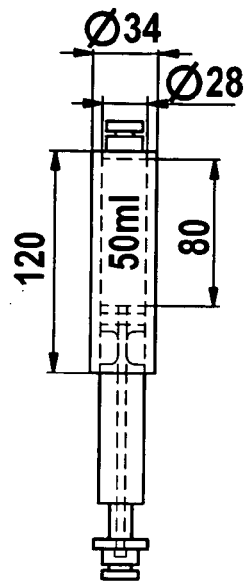
FIGS. 3a to 3f show cross-sectional views of several variants of the metering element shown in FIGS. 1 and 2.
Figure 3B:
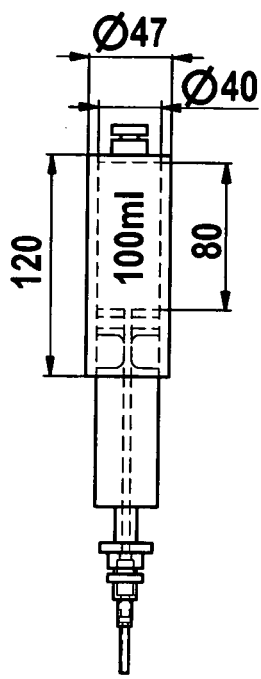
Figure 3C:
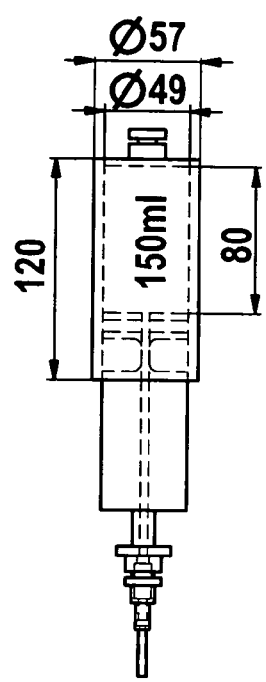
Figure 3D:
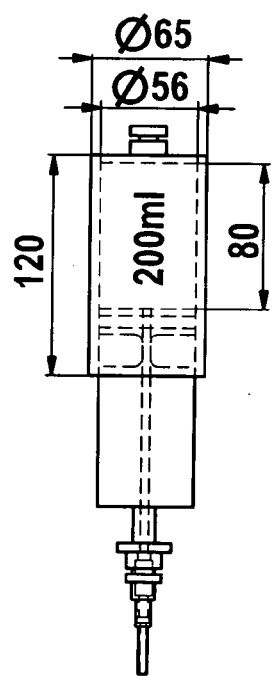
Figure 3E:
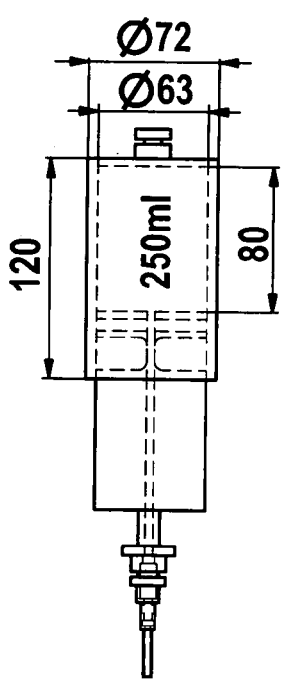
Figure 3F:
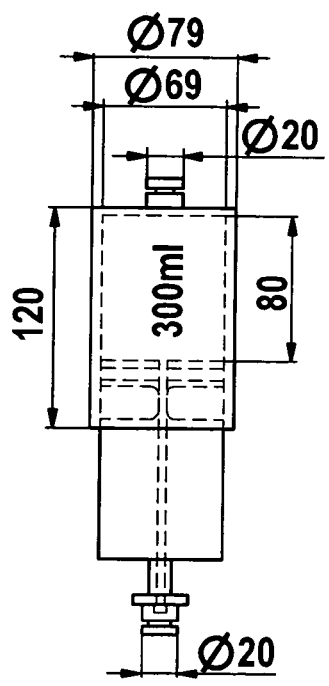

The metering element illustrated in FIG. 3a is shown with metering needle 24 removed; it becomes clear that, instead of metering needles, other metering devices such as pourers may be mounted as well or that the metering element is permanently connectable to a sealed metering or reaction apparatus. The metering element shown in FIG. 3f is connected not to a metering needle, but instead to a hollow line or a piston having a wider diameter. This may be a component of an overall apparatus.

The described metering device is suitable for, in particular, the metering of highly viscous media such as suspensions or dispersions.

What is claimed is:

1. A metering device comprising:
   a metering element having a supply reservoir, open on one side, for holding a substance to be metered;
   a plunger that is axially displaceable and reversibly seals an opening of the supply reservoir, the plunger having at least one centered metering orifice for metering the substance deposited in the supply reservoir, wherein at least one of the supply reservoir and the plunger has an accommodation as a contact point for a mechanical gripping device;
   a piston barrel to which is joined the plunger
   an exchangeable metering needle joined to the end of the piston barrel facing away from the plunger; and
   a Luer lock closure by which the piston barrel is joined to the metering needle; wherein:
   the plunger includes a metering line for metering the deposited substance, and
   the piston barrel includes an end facing away from the plunger and at which the accommodation is implemented.

2. A metering device comprising:
   a metering element having a supply reservoir, open on one side, for holding a substance to be metered; and
   a plunger that is axially displaceable and reversibly seals an opening of the supply reservoir, the plunger having at least one centered metering orifice for metering the substance deposited in the supply reservoir, wherein at least one of the supply reservoir and the plunger has an accommodation as a contact point for a mechanical gripping device,
   wherein a plurality of metering devices is provided whose supply reservoirs have a substantially identical linear extension and different diameters.

3. A metering device comprising:
   a metering element having a supply reservoir, open on one side, for holding a substance to be metered; and a plunger that is axially displaceable and reversibly seals an opening of the supply reservoir, the plunger having at least one centered metering orifice for metering the substance deposited in the supply reservoir, wherein at least one of the supply reservoir and the plunger has an accommodation as a contact point for a mechanical gripping device.

wherein the accommodation has a coding to detect one of a volume and a diameter of the supply reservoir.

4. A metering device, comprising:
a supply vessel, open on one side, for holding a substance to be metered; and
a plunger that is axially displaceable and reversibly seals an opening of the supply vessel, the plunger having at least one centered metering orifice for metering the substance deposited in the supply vessel, wherein at least one of the supply vessel and the plunger includes an accommodation as a contact point for a mechanical gripping device,
wherein the metering device is for metering the substance in compiling a combinatory material library.

5. A method for metering at least one substance, comprising:
depositing the at least one substance in a supply reservoir, open on one side;
reversibly sealing an opening of the supply reservoir by a plunger that is axially displaceable;
gripping the supply reservoir by a mechanical gripping device; and
metering the at least one deposited substance through at least one metering orifice penetrating the plunger by applying a pressure on the plunger;
wherein:
the at least one substance includes at least two substances,
the at least two substances are deposited in the supply reservoir, and
the at least two substances are mixed in the supply reservoir prior to metering by a mixing device that is one of integrated in the supply reservoir and provided externally.

6. A method for metering at least one substance, comprising:
depositing the at least one substance in a supply reservoir, open on one side;
reversibly sealing an opening of the supply reservoir by a plunger that is axially displaceable;
gripping the supply reservoir by a mechanical gripping device;
metering the at least one deposited substance through at least one metering orifice penetrating the plunger by applying a pressure on the plunger; and performing a chemical conversion of the at least one deposited substance in the supply reservoir prior to the metering.

7. A method for metering at least one substance, comprising:
depositing the at least one substance in a supply reservoir, open on one side;
reversibly sealing an opening of the supply reservoir by a plunger that is axially displaceable;
gripping the supply reservoir by a mechanical gripping device; and
metering the at least one deposited substance through at least one metering orifice penetrating the plunger by applying a pressure on the plunger,
wherein the method is for metering the at least one substance in compiling a combinatory material library.

8. The method as recited in claim 7, further comprising:
after reversibly sealing the supply reservoir, degassing the at least one deposited substance through the at least one metering orifice.

9. A metering device, comprising:
a metering element having a supply reservoir, open on one side, for holding a substance to be metered; and
a plunger that is axially displaceable and reversibly seals an opening of the supply reservoir, the plunger having at least one centered metering orifice for metering the substance deposited in the supply reservoir, wherein at least one of the supply reservoir and the plunger has an accommodation as a contact point for a mechanical gripping device,
wherein the metering device is for metering the substance in compiling a material library.

10. The metering device as recited in claim 9, wherein the supply reservoir includes the accommodation at a boundary surface thereof lying opposite the opening.

11. The metering device as recited in claim 9, further comprising:
a piston barrel to which is joined the plunger, wherein:
the plunger includes a metering line for metering the deposited substance, and
the piston barrel includes an end facing away from the plunger and at which the accommodation is implemented.

12. The metering device as recited in claim 11, further comprising:
an exchangeable metering needle joined to the end of the piston barrel facing away from the plunger.

* * * * *